(12) United States Patent
Cahill et al.

(10) Patent No.: US 9,591,038 B2
(45) Date of Patent: Mar. 7, 2017

(54) FEATURE SET DIFFERENTIATION BY TENANT AND USER

(71) Applicant: MICROSOFT TECHNOLOGY LICENSING, LLC, Redmond, WA (US)

(72) Inventors: Jason Cahill, Woodinville, WA (US); Brian Robbins, Kirkland, WA (US); Zachary Rosenfield, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 145 days.

(21) Appl. No.: 14/153,637

(22) Filed: Jan. 13, 2014

(65) Prior Publication Data

US 2014/0130132 A1 May 8, 2014

Related U.S. Application Data

(63) Continuation of application No. 12/795,334, filed on Jun. 7, 2010, now Pat. No. 8,631,333.

(51) Int. Cl.
| | |
|---|---|
| G06F 3/048 | (2013.01) |
| H04L 29/06 | (2006.01) |
| G06Q 10/10 | (2012.01) |

(52) U.S. Cl.
CPC ........... H04L 65/403 (2013.01); G06Q 10/10 (2013.01); H04L 63/08 (2013.01)

(58) Field of Classification Search
CPC ........ H04L 65/403; H04L 63/08; G06Q 10/10

(Continued)

(56) References Cited

U.S. PATENT DOCUMENTS

| | | |
|---|---|---|
| 7,000,228 B2 | 2/2006 | Mortazavi |
| 7,409,463 B2 | 8/2008 | Ramachandran |

(Continued)

FOREIGN PATENT DOCUMENTS

| | | |
|---|---|---|
| CN | 101103354 A | 1/2008 |
| CN | 101652787 A | 2/2010 |

(Continued)

OTHER PUBLICATIONS

A Managing Catalog Permissions and Privileges, http://docs.oracle.com/cd/E35225_01/doc.11/e29108/dash_reps.htm, 11 pages (Copyright 2011).

(Continued)

*Primary Examiner* — David Phantana Angkool
(74) *Attorney, Agent, or Firm* — Julie Kane; Tom Wong; Micky Minhas

(57) ABSTRACT

A system for online collaboration includes an application for online collaboration, the application including an application feature set, a control module programmed to receive a request from a user to access a tenancy associated with the application on the system, the tenancy including a site provisioned for a tenant, the request including a tenancy identifier identifying the tenancy and a user identifier identifying the user, the control module using the tenancy identifier to identify a tenancy feature set associated with the tenancy, and the control module using the user identifier to identify a user feature set associated with the user, and a web-page render module programmed to generate a collaboration web site including a site feature set including the tenancy feature set and the user feature set, the web site being sent to the user for rendering on the user's computing device.

20 Claims, 8 Drawing Sheets

(58) Field of Classification Search
USPC .......................................................... 715/751
See application file for complete search history.

(56) References Cited

U.S. PATENT DOCUMENTS

| | | | |
|---|---|---|---|
| 7,463,610 B2 | 12/2008 | Collins | |
| 8,146,168 B2* | 3/2012 | Nakazawa | H04L 9/3247 705/51 |
| 8,275,197 B2* | 9/2012 | Hawkins | H04M 3/56 382/165 |
| 8,423,779 B2* | 4/2013 | Hamlin | G06F 21/34 713/176 |
| 8,631,333 B2* | 1/2014 | Cahill | G06Q 10/10 705/59 |
| 8,713,161 B2* | 4/2014 | Shinomiya | G06F 21/10 709/203 |
| 8,806,320 B1* | 8/2014 | Abdo | G06F 17/30017 715/203 |
| 8,863,241 B2* | 10/2014 | Ratiner | G06F 21/10 380/259 |
| 9,092,254 B2* | 7/2015 | Bhogal | G06F 9/468 |
| 2004/0054717 A1 | 3/2004 | Aubry et al. | |
| 2005/0234777 A1 | 10/2005 | Bird et al. | |
| 2007/0244824 A1 | 10/2007 | Motley et al. | |
| 2008/0244184 A1 | 10/2008 | Lewis et al. | |
| 2008/0270987 A1 | 10/2008 | Weissman | |
| 2009/0144720 A1 | 6/2009 | Roush et al. | |
| 2010/0023937 A1 | 1/2010 | Kothari et al. | |
| 2010/0058318 A1 | 3/2010 | Bernabeu-Auban et al. | |
| 2010/0125612 A1 | 5/2010 | Amradkar et al. | |
| 2010/0332404 A1* | 12/2010 | Valin | G06Q 30/0239 705/310 |
| 2013/0018753 A1 | 1/2013 | Waldrop et al. | |
| 2013/0019320 A1 | 1/2013 | Ericsson et al. | |
| 2013/0036459 A1 | 2/2013 | Liberman et al. | |
| 2013/0080776 A1 | 3/2013 | Elduff | |
| 2013/0091217 A1 | 4/2013 | Schneider | |
| 2013/0151970 A1 | 6/2013 | Achour | |
| 2013/0174275 A1 | 7/2013 | Micucci et al. | |
| 2015/0135043 A1* | 5/2015 | Apps | G06Q 10/06 715/202 |
| 2016/0034305 A1* | 2/2016 | Shear | G06F 9/50 707/722 |
| 2016/0210602 A1* | 7/2016 | Siddique | G06Q 20/12 |

FOREIGN PATENT DOCUMENTS

| | | |
|---|---|---|
| RU | 2371758 C2 | 10/2009 |
| TW | 200941261 A | 10/2009 |
| TW | 201017574 A | 5/2010 |

OTHER PUBLICATIONS

Administering the Query Log, http://docs.oracle.com/cd/E12096_01/books/admintool/admintool_AdministerQuery14.html, 4 pages (Copyright 2007).
Oracle B1 Applications Security, http://docs.oracle.com/cd/E25054_01/fusionapps.1111/e16816/biapps_security.htm#CDDIBHDJ, 26 pages (Copyright 2011).
Oracle Unveils Oracle® Business Intelligence 11g, http://www.oracle.com/us/corporate/press/143363, 2 pages (Apr. 7, 2010).
Using Actions to Integrate Oracle BI EE with External Systems, http://docs.oracle.com/cd/E23943_01/bi.1111/e16364/actions.htm, 22 pages (Copyright 2010).
"First Office Action Issued in Chinese Patent Application No. 201180027916.0", Mailed Date: Jan. 5, 2015, 13 Pages.
European Search Report for Application No. 11792856.4 mailed May 26, 2014.
International Searching Authority, The International Search Report and The Written Opinion, International Application No. PCT/US2011/037357, Feb. 9, 2012, 8 pages.
Microsoft Service Provider Differentiation Playbook; partner.microsoft.com/download/sverige/40092260; Nov. 2008; 12 pgs.
Online Application Upgrade Using Edition-Based Redefinition; cs.cmu.edu/~tdumitra/hotswup09/papers/Choi_EditionBasedRedefinition.pdf; Oct. 25, 2009; 5 pgs.
Upgrading PHP Web Applications with Minimum Downtime using Oracle Editioning; blogs.oracle.com/opal/2009/09/upgrading_php_web_applications.html;Sep. 1, 2009; 3 pgs.
Upgrading Play! Applications without Downtime; lunatech-research.com/archives/2010/03/22/upgrading-play-applications-without-downtime; Mar. 22, 2010; 3 pgs.
"Office Action Issued in Russian Patent Application No. 2012152637", Mailed Date: Jun. 11, 2015, 5 Pages. (w/o English Translation).
"Notice of Allowance Issued in Russian Patent Application No. 2012152637", Mailed Date: Jan. 18, 2016, 10 Pages. (w/o English Translation).
"Office Action and Search Report Issued in Taiwan Patent Application No. 104142739", Mailed Date: Mar. 11, 2016, 9 Pages.
"Office Action Issued in Taiwan Patent Application No. 100114487", Mailed Date: Oct. 5, 2015, 9 Pages.
Chinese Notice of Allowance Issued in Patent Application No. 201180027916.0, Mailed Date: Aug. 5, 2015, 4 Pages.
Taiwan Notice of Allowance Received in Patent Application No. 100114487, Mailed Date: Apr. 27, 2016, with English Translation 4 Pages.
Taiwan Office Action Issued in Patent Application No. 104142739, Mailed Date: Jul. 29, 2016, without English Translation 4 Pages.
"Office Action Issued in European Patent Application No. 11792856A", Mailed Date: Oct. 20, 2016, 8 pages.

\* cited by examiner

Server Device 110

Application 300

| Full Feature Set 305 | Feature Tag 310 | First Tier 325 | Second Tier 330 | Third Tier 335 | "User 1" Individual License 340 |
|---|---|---|---|---|---|
| Feature A | FA | X | X | X | |
| Feature B | FB | X | X | X | |
| Feature C | FC | | X | X | X |
| Feature D | FD | | | X | |
| Feature E | FE | | | | X |
| Feature F | FF | X | X | X | |
| Feature G | FG | X | | | |
| Feature H | FH | | X | X | |
| Feature I | FI | | | X | |
| Feature J | FJ | | | | |

Document Collaboration Features 315: Feature A – Feature F

Resource Features 320: Feature G – Feature J

FIG. 3

FEATURE SET DIFFERENTIATION BY TENANT AND USER

CROSS REFERENCE TO RELATED APPLICATIONS

This application is a continuation of U.S. patent application Ser. No. 12/795,334, filed Jun. 7, 2010, and entitled FEATURE SET DIFFERENTIATION BY TENANT AND USER, now U.S. Pat. No. 8,631,333, issued on Jan. 14, 2014, the disclosure of which is incorporated by reference herein in its entirety.

BACKGROUND

An on-line service is typically limited to a fixed set of base features that can be purchased by an entity such as a single user or an organization. Adding or removing functionality to the fixed set of features may incur user-perceived downtime. Additionally, custom deployment of software for a specific set of features can become unmanageable when multiple instances of similar, yet different software deployments are desired.

SUMMARY

In one aspect, a system for online collaboration includes: at least one computer readable storage medium; and at least one processing unit that executes instructions stored on the computer readable storage medium to create: an application for online collaboration, the application including an application feature set; a control module programmed to receive a request from a user to access a tenancy associated with the application on the system, the tenancy including a site provisioned for a tenant, the request including a tenancy identifier identifying the tenancy and a user identifier identifying the user, the control module using the tenancy identifier to identify a tenancy feature set associated with the tenancy, and the control module using the user identifier to identify a user feature set associated with the user; and a web-page render module programmed to generate a collaboration web site including a site feature set including the tenancy feature set and the user feature set, the web site being sent to the user for rendering on the user's computing device.

In another aspect, a method for providing an online collaboration site includes: receiving a request from a user to access the online collaboration site; identifying a tenancy associated with the request, including a tenancy feature set; identifying a user identifier associated with the user making the request; querying to identify a user feature set associated with the user identifier; preparing the online collaboration site, the site including the tenancy feature set and the user feature set, each of the tenancy feature set and the user feature set being less than an application feature set for the online collaboration site; and sending the site to the user.

In yet another aspect, a method for providing an online collaboration site includes: receiving a request from a user to access the online collaboration site; identifying a tenancy associated with the request, including a tenancy feature set; provisioning the tenancy feature set during creation of the tenancy; identifying a user identifier associated with the user making the request; querying to identify a user feature set associated with the user identifier; preparing the online collaboration site, the site including the tenancy feature set and the user feature set, each of the tenancy feature set and the user feature set being less than an application feature set for the online collaboration site; sending the site to the user; allowing the user to add features to the user feature set; and adding features to the tenancy feature set without downtime for the online collaboration site.

This Summary is provided to introduce a selection of concepts, in a simplified form, that are further described below in the Detailed Description. This Summary is not intended to identify key or essential features of the claimed subject matter, nor is it intended to be used in any way to limit the scope of the claimed subject matter.

DESCRIPTION OF THE DRAWINGS

Aspects of the present disclosure may be more completely understood in consideration of the following detailed description of various embodiments in connection with the accompanying drawings.

FIG. 3 shows an example business application installed on an example computing device from the environment of FIG. 1.

DETAILED DESCRIPTION

The present disclosure is directed to systems and methods for separating a set of software features across multiple users, multiple tenants, and multiple levels of features such that a feature set is distinguishable by levels of access and control across individual users, companies or teams without incurring user-perceived downtime.

The following example embodiments are described with respect to Microsoft SHAREPOINT® collaboration software from Microsoft Corporation of Redmond, Wash. However, the systems and methods of the present disclosure are applicable to any situation in which it is desirable to offer a multi-tiered, multi-tenancy service in which a single instance of software is configured to selectively present functional capabilities to a customer.

Figure 1:
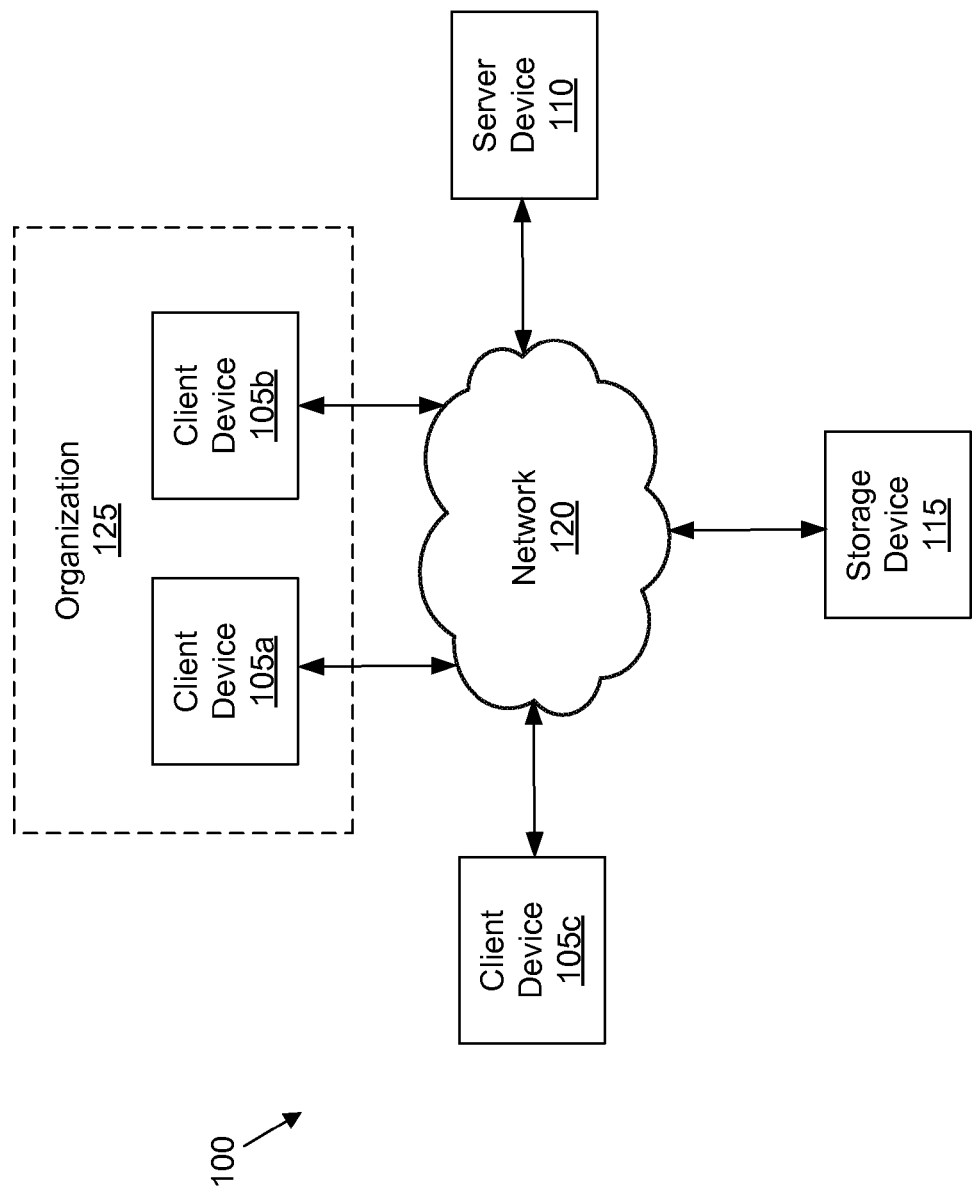
FIG. 1 shows an example networked computing environment.

FIG. 1 shows an example networked computing environment 100. The example environment 100 includes a plurality of client devices 105a-c (collectively, client devices 105), a server device 110, a storage device 115, and a network 120.

The respective client devices 105a-b are logically grouped together within an organization 125. An examples organization includes a company, business, enterprise, or any other any type of structured entity. In the example shown, the client device 105c is external to the organization. Other configurations of the example environment 100 are possible. For example, the networked computing environment 100 may generally include more or fewer devices, networks, organizations, and other components as desired.

The client devices 105 and the server device 110 are general purpose computing devices, such as described below in connection with FIG. 2. In example embodiments, the server device 110 is a business server that implements business services and/or processes. Example business processes include real-time communications and collaboration processes, data management processes, search processes, and others. SHAREPOINT® Server from Microsoft Corporation of Redmond, Wash. is an example of a business server that implements real-time communications and collaboration processes in support of centralized resource and workflow management for sharing information across Intranet, Extranet, and Internet sites, both as on-premises software and as an on-line hosted service. In some embodiments, the server device 110 includes a plurality of interconnected server devices operating together to implement business services. Other embodiments of the server device 110 are possible.

The storage device 115 is a data storage device, such as a relational database or any other type of persistent data storage device. In example embodiments, the storage device 115 stores data in a predefined format such that the client devices 105 and/or the server device 110 can query, modify, and manage data stored thereon. Examples of such a data storage device include data stores configured to store a shared set of software feature permissions, definitions, and services, such the ACTIVE DIRECTORY® directory service from Microsoft Corporation. In some embodiments, the storage device 115 includes a plurality of data storage devices logically grouped together in an interconnected configuration. Other embodiments of the storage device 115 are possible.

The network 120 is a bi-directional data communication path for data transfer between compatibly configured devices. In the example shown, the network 120 establishes a communication path for data transfer between the client devices 105, server device 110, and the storage device 115. In general, the network 120 can be of any number of one or more of a combination of wireless or hardwired WAN, LAN, Intranet, Extranet, Internet, or other packet-based communication networks such that data can be transferred among the elements of the example environment 100. Still other embodiments of the network 120 are possible as well.

Figure 2:
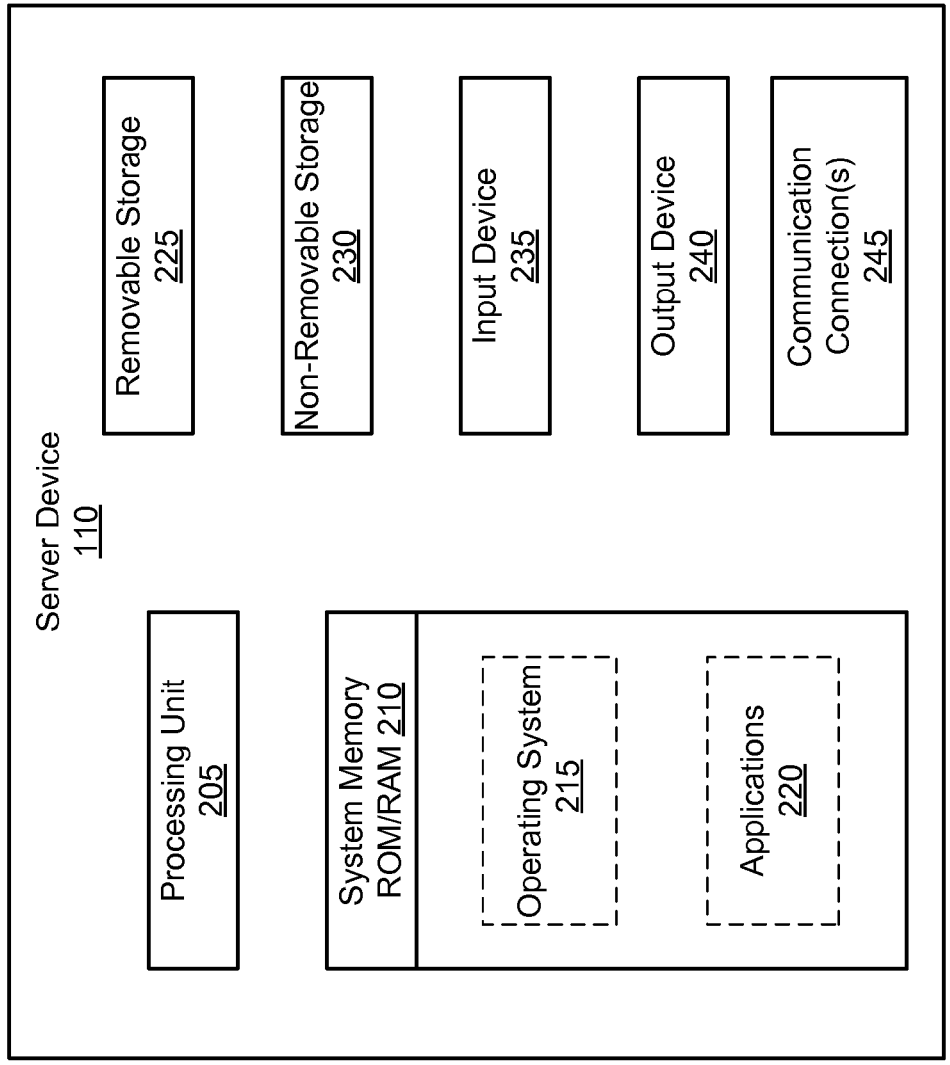
FIG. 2 shows an example computing device from the environment of FIG. 1.

Referring now to FIG. 2, the server device 110 of FIG. 1 is shown in further detail. As mentioned above, the server device 110 is a general purpose computing device. Example general purpose computing devices include a desktop computer, laptop computer, personal data assistant, smartphone, cellular phone, and other types computing devices.

The server device 110 includes at least one processing unit 205 and system memory 210. The system memory 210 includes an operating system 215 for controlling the operation of the server device 110. One example operating system 215 is the WINDOWS® operating system from Microsoft Corporation. Other types of operating systems are possible as well.

The system memory 210 may also include one or more applications 220. Applications 220 may include many different types of single and multiple-functionality programs, such as an electronic mail program, a calendaring program, a browser program, a spreadsheet program, a program to track and report information, a word processing program, an instant messaging program, a document management program, and many others. One example program is the OFFICE® suite of applications from Microsoft Corporation. Another example program is a server, such as SHAREPOINT® Server or Exchange Server, each also from Microsoft Corporation. Still other example applications are possible as well.

The system memory 210 includes computer readable media. Examples of computer readable media include computer readable storage media. Other examples of computer readable media include communications media.

Computer readable storage media includes physical media such as, for example, volatile and nonvolatile, removable and non-removable media implemented in any method or technology for storage of information, such as computer readable instructions, data structures, program modules, or other data. Computer readable storage media can also include, but is not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by server device 110. Any such computer storage media may be part of or external to the server device 110. Additional storage media formed as part of the server device is illustrated in FIG. 2 by removable storage 225 and non-removable storage 230.

Communication media may typically be embodied by computer readable instructions, data structures, program modules, or other data in a modulated data signal, such as a carrier wave or other transport mechanism, and includes any information delivery media. The term "modulated data signal" refers to a signal that has one or more of its characteristics set or changed in such a manner as to encode information in the signal. By way of example, communication media includes wired media such as a wired network or direct-wired connection, and wireless media such as acoustic, RF, infrared and other wireless media.

The server device 110 may include any number and type of input devices 235 and output devices 240. Example input devices 235 include a keyboard, mouse, pen, voice input device, touch input device, and others. Example output devices 240 include a display, speakers, printer, and others. The server device 110 can also include a communication connection 245 configured to enable communications with other computing devices such as for example over a network (e.g., network 120) in a distributed computing environment.

In example embodiments, the client device 105 of FIG. 1 is configured similar to the server device 110 described above.

Referring now to FIG. 3, the server device 110 of FIG. 2 is shown including an example software application 300 installed thereon. In one embodiment, the example application 300 is installed within the system memory 210 of the server device 110 such as described above. However, other embodiments are possible.

The example application 300 includes logical modules of software executing on the server device 110 configured to provide a hosted collaboration portal that allows for document management and sharing among customers that subscribe to various functionality of the application 300. Example customers include individual users, organizations, and other types of entities. It will be appreciated that one or more other types of hosted services may be implemented by the server device 110 as well.

The example application 300 includes a full feature set 305 comprising a plurality of features each configured to provide a designated functionality to a subscribing customer of the application 300. Each of the respective features of the full feature set 305 are uniquely identified by a corresponding feature tag 310. For example, Feature A is identified by a tag FA, Feature B is identified by a tag FB, Feature I is identified by a tag FI, and etc. Other types of identifiers may be used to distinctly identity individual features of the full feature set 305.

The example full feature set 305 is segmented into document collaboration features 315 and resource features 320. However, it will be appreciated that other types of features of the full feature set 305 are possible as well.

In the example embodiment of FIG. 3, document collaboration features 315 correspond to document manipulation functionality provided by the application 300. For example, feature FA may include a "view document" function that permits a customer to select a document for viewing within the hosted collaboration portal of the application 300. The feature FB may include a "download document" function that permits a customer to save a document from the hosted collaboration portal space of the application 300 to a local hard drive of a client device (e.g., client device 105). The feature FC may include an "edit document function" that permits a customer to edit a document within the hosted collaboration portal of the application 300.

Many other types of document collaboration features 315 are possible as well. For example, in some embodiments, a given document collaboration feature (e.g., feature FE) may represent a set of document manipulation functionality, such as for example document manage functionality, in contrast to the example individual functionality of features FA, FB, and FC as described above. Still other embodiments are possible as well.

Resource features 320 correspond to computing resource functionality provided in support of the application 300. For example, feature FG may include a first specified amount of storage space available for use per customer, feature FH may include a second specified amount of storage space available for use per customer, and feature FI may include a first specified amount of bandwidth available per customer. Many other types of resource features 320 are possible as well.

Each of the respective features of the full feature set 305 may selectively be either a non-monetized feature or a monetized feature. For example, an administrator or developer may selectively determine that features FA and FG are non-monetized features of the application 300. In the example embodiment, these features may be provided to a customer of the application 300 free of charge along with general subscription to the application 300. In contrast, the features FB, FC, and FH may be designated as monetized features of the application 300 by an administrator or developer. These features may be licensed for use by a customer of the application 300 upon payment of a predetermined fee.

The full feature set 305 may be selectively grouped as desired into tiered sets of offered functionality. For example, the features FA, FB, FF, and FG may be bundled together into a monetized offering designated as a first tier 325. A monetized second tier 330 including an expanded set of functionality may include the features FA, FB, FC, FF, and FH. Similarly, a monetized third tier 335 including a further expanded set of functionality may include the features FA, FB, FC, FD, FF, FH, and FI. In general, the example full feature set 305 may be segmented in any desired manner into any of a plurality of different tiered sets of offered functionality.

The full feature set 305 may be selectively grouped as desired into tiered sets of offered functionality. For example, the features FA, FB, FF, and FG may be bundled together into a monetized offering designated as a first tier 325. A monetized second tier 330 including an expanded set of functionality may include the features FA, FB, FC, FF, and FH. Similarly, a monetized third tier 335 including a further expanded set of functionality may include the features FA, FB, FC, FD, FF, FG, FH, and FI. In general, the example full feature set 305 may be segmented in any desired manner into any of a plurality of different tiered sets of offered functionality.

The example first tier 325, second tier 330, and third tier 335 may each respectively be referred to as a "feature pack" which represents a given set of functionality that may be purchased as a bundle for use by a customer of the application 300. However, a customer may additionally selectively purchase individual features of the full feature set 305. For example, a customer "User 1" may purchase an individual license 340 that includes one or more features, such as the features FC and FE. In example embodiments, any upgrade or downgrade of features, such as a transition between respective tiers 325, 330, 335 or modification of features of the individual license 340, includes minimal downtime and impact on customer experience. Specifically, newly purchased features are seamlessly added and start working immediately upon payment of suitable fees and unsubscribed features are seamlessly removed without service interruption.

In example embodiments, a given instance of hosted collaboration portal that allows for document sharing between customers is referred to as a "tenancy," which is associated with an entity that purchases a respective "feature pack" as defined above. For example, referring now additionally to FIG. 4, a first organization 400 and a different second organization 405 are shown.

The example first organization 400 is shown including a first tenancy 410 configured to subscribe to functionality offered by the first tier 325 "feature pack," as described above. In example embodiments, the first organization 400 has purchased the first tier 325 such that one or more individual users can leverage the functionality of the first tier 325 for document collaboration. Customer accounts 415 associated with the first tenancy 410 defines a list of individual users that may log-on and access functionality of the first tier 325, as provided by the first tenancy 410. In the example shown, customer accounts 415 include the customer "User 1" and a second customer "User 2." In this manner, the customers "User 1" and "User 2" are exposed to the features FA, FB, FF, and FG offered by the first tier 325 when accessing the first tenancy 410 for document collaboration such as, for example, by accessing a dedicated Internet website identified by a specified Uniform Resource Locator (URL) as described further below in connection with FIG. 5. However, the customer "User 1" owns an individual license 340 that includes features FC and FE as described above. As such, the customer "User 1" is further exposed to the features FC and FE, in addition to the features FA, FB, FF, and FG when accessing the first tenancy 410 for document collaboration.

In the example embodiment, customer accounts 425 include the customer "User 1" and a third customer "User 3." The customers "User 1" and "User 3" are therefore exposed to the features FA, FB, FC, FF, and FH offered by the second tier 330 when accessing the second tenancy 420 for document collaboration such as, for example, by accessing a dedicated Internet website identified by a specified Uniform Resource Locator (URL). However, as mentioned above the customer "User 1" has purchased an individual license 340 that includes features FC and FE. In this manner, the customer "User 1" is further exposed to the feature FE, in addition to the features FA, FB, FC, FF, and FH when accessing the second tenancy 420.

In the example embodiment, customer accounts 425 include the customer "User 1" and a third customer "User 3." The customers "User 1" and "User 3" are therefore exposed to the features FA, FB, FC, FF, and FH offered by the second tier 330 when accessing the second tenancy 420 for document collaboration such as, for example, by accessing a dedicated Internet website identified by a specified Uniform Resource Locator (URL). However, as mentioned above the customer "User 1" has purchased an individual license 340 that includes features FC and FE. In this manner, the customer "User 1" is further exposed to the feature FE, in addition to the features FA, FB, FC, FF, and FG when accessing the second tenancy 420.

Figure 4:
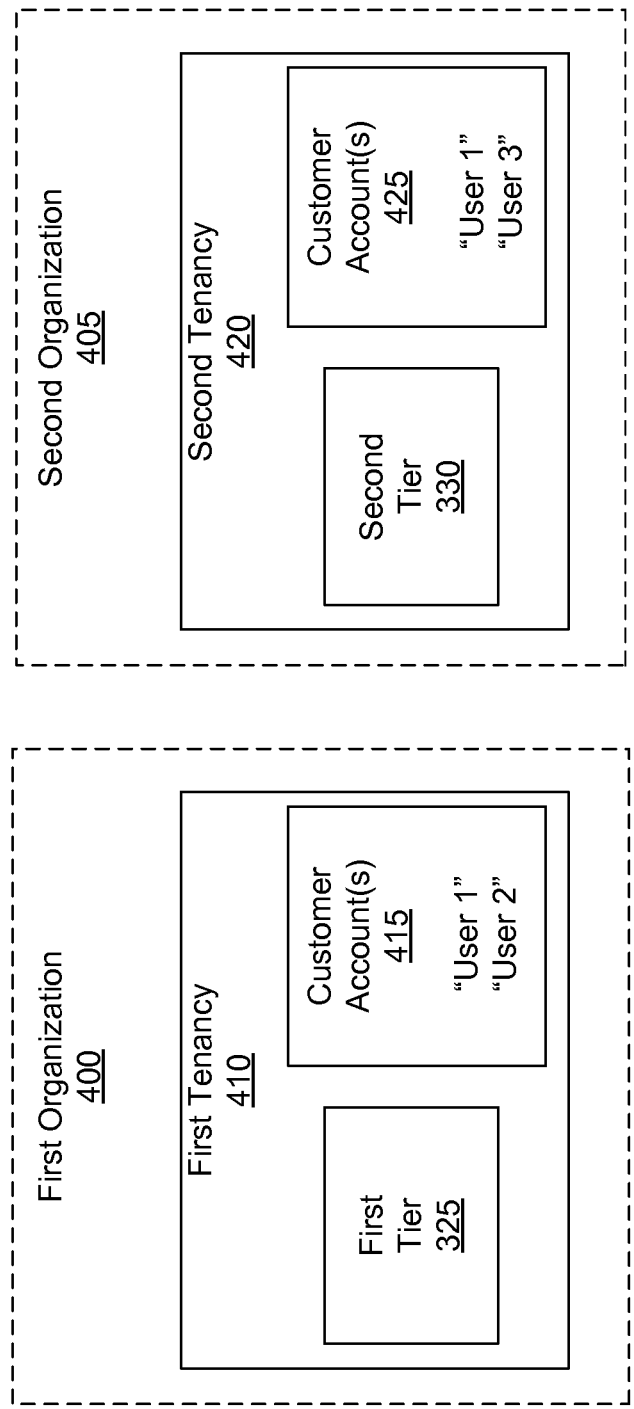
FIG. 4 shows an example tenancy configuration.

In the examples described with respect to FIG. 4, the application 300 is configured to differentiate feature sets corresponding to the first tier 325 associated with the first tenancy 410 as purchased by the first organization 400 and the second tier 330 associated with the second tenancy 420 as purchased by the second organization 405, as well as the features set corresponding to the individual license 340 purchased by the customer "User 1". Feature set differentiation between a respective tenancy and individual user is performed separately and uniquely in a programmatic manner by the application 300 such that the individual license 340 purchased by the customer "User 1" applies as "User 1" collaborates with different organizations and different tenancies.

Figure 5:
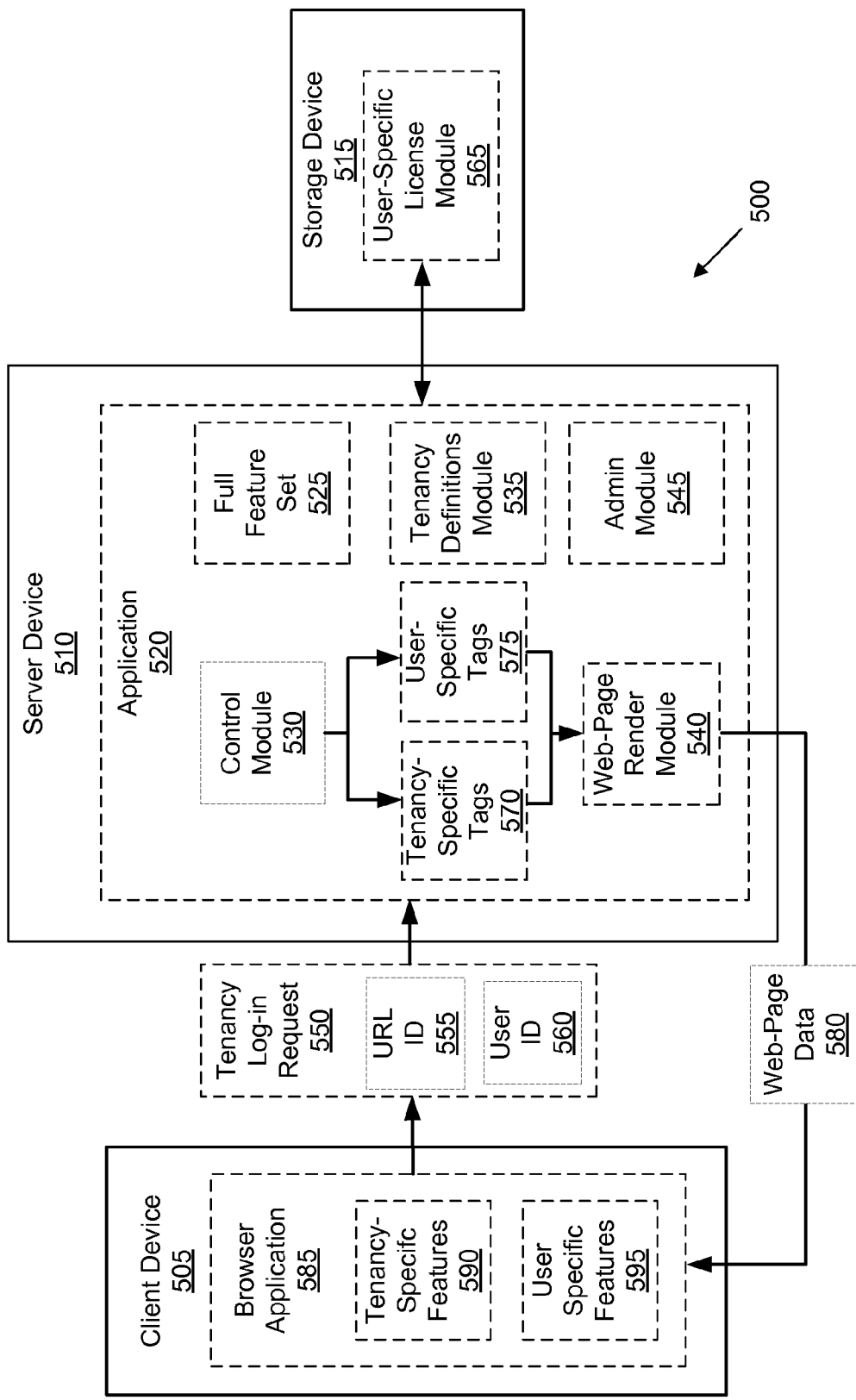
FIG. 5 shows an example client device and an example server device.

Referring now to FIG. 5, a schematic block diagram 500 illustrates example communications between an example client device and an example server device in accordance with the present disclosure. The example diagram 500 includes a client device 505, a server device 510, and a storage device 515 each configured similar to corresponding devices described above with respect to FIGS. 1-4. However, other configurations are possible. For example, the schematic block diagram 500 may generally include more or fewer client devices, server devices, storage devices, and other components as desired.

The server device 510 includes an application 520 configured to provide a hosted on-line collaboration portal which supports document sharing between customers that subscribe to functionality of the application 520. The example application 520 includes a full feature set 525 comprising a plurality of features (e.g., features FA-FJ as shown in FIG. 3) each configured to provide a designated functionality to a subscribing customer of the application 520. In this manner, all features and services of the application 520 are fully installed on the server device 510.

In example embodiments, the application 520 further includes a control module 530, a tenancy definitions module 535, a web-page render module 540, and an administration module 545.

The control module 530 is configured to receive and process a tenancy log-in request 550 received from the client device 505. The tenancy log-in request 550 includes a Uniform Resource Indicator (URL) ID 555 (e.g., a requested web page of first tenancy 410) and a user ID 560 (e.g., "User 1"). In general, the URL ID 555 is one form of a tenancy identifier used to identify a specific tenancy. However, other forms of a tenancy identifier are possible as well.

Upon receiving the tenancy log-in request 550, the control module 530 analyzes the tenancy log-in request 550 and queries the tenancy definitions module 535 to: a) verify a feature pack (e.g., first tier 325) associated with the URL ID 555; and b) authenticate the user ID 560 as valid for accessing a specific tenancy associated with the URL ID 555. The tenancy definitions module 535 is populated with tenancy-specific feature pack information and user identification information upon initial provisioning of a specific tenancy associated with the URL ID 555.

In example embodiments, the administration module 545 may be accessed via an external device (e.g., client device 505) to initialize or provision a tenancy associated with the URL ID 555 in manner consistent with the examples described above with respect to FIG. 4. However, other embodiments are possible.

The control module 530 is further configured to query a user-specific license module 565 on the storage device 515 to determine whether a user associated with the user ID 560 has an individual license (e.g., individual license 340) to use one or more features of the full feature set 525 of the example application 520. In general, the example user-specific license module 565 includes individual licenses associated with a plurality of individual users of the example application 520. The administration module 545 may be accessed via an external device (e.g., client device 505) to define individual licenses associated with a plurality of individual users of the example application 520

Based on results of the query of the tenancy definitions module 535 and the user-specific license module 565, tenancy-specific tags 570 and user-specific tags 575 are subsequently forwarded to the web-page render module 540 from the control module 530. The example tenancy-specific tags 570 include all feature tags (e.g., FA, FB, FF, and FG) offered by a feature pack (e.g., first tier 325) associated with the URL ID 555. The example user-specific tags 575 include all feature tags (e.g., FC and FE) associated with the individual license (e.g., individual license 340) corresponding to the user ID 560. When a user associated with the user ID 560 has not purchased an individual license, the user-specific tags 575 includes a null set.

The web-page render module 540 is configured to receive and process the tenancy-specific tags 570 and user-specific tags 575 and transfer associated web-page data 580 to a browser application 585 on the client device 505. For example, the web-page render module 540 examines the tenancy-specific tags 570 and user-specific tags 575 and identifies corresponding features of the full feature set 525. All functionality associated with the tenancy-specific tags 570 and user-specific tags 575 being encoded within the web-page data 580.

In the example embodiment, the example browser application 585 interprets the web-page data 580 and presents tenancy-specific features 590 in accordance with the tenancy-specific tags 570 and user-specific features 595 in accordance with the user-specific tags 575 to a user of the client device 505. In general, the browser application 585 is unaware of and does not persist tenancy information as contained within the tenancy log-in request 550 or web-page data 580.

As described in connection with FIG. 5, a user associated with user ID 560 is presented with a union of features of the full feature set 525 offered by the specific tenancy associated with the URL ID 555 and features of the full feature set 525 licensed to the user associated with user ID 560.

Figure 6:
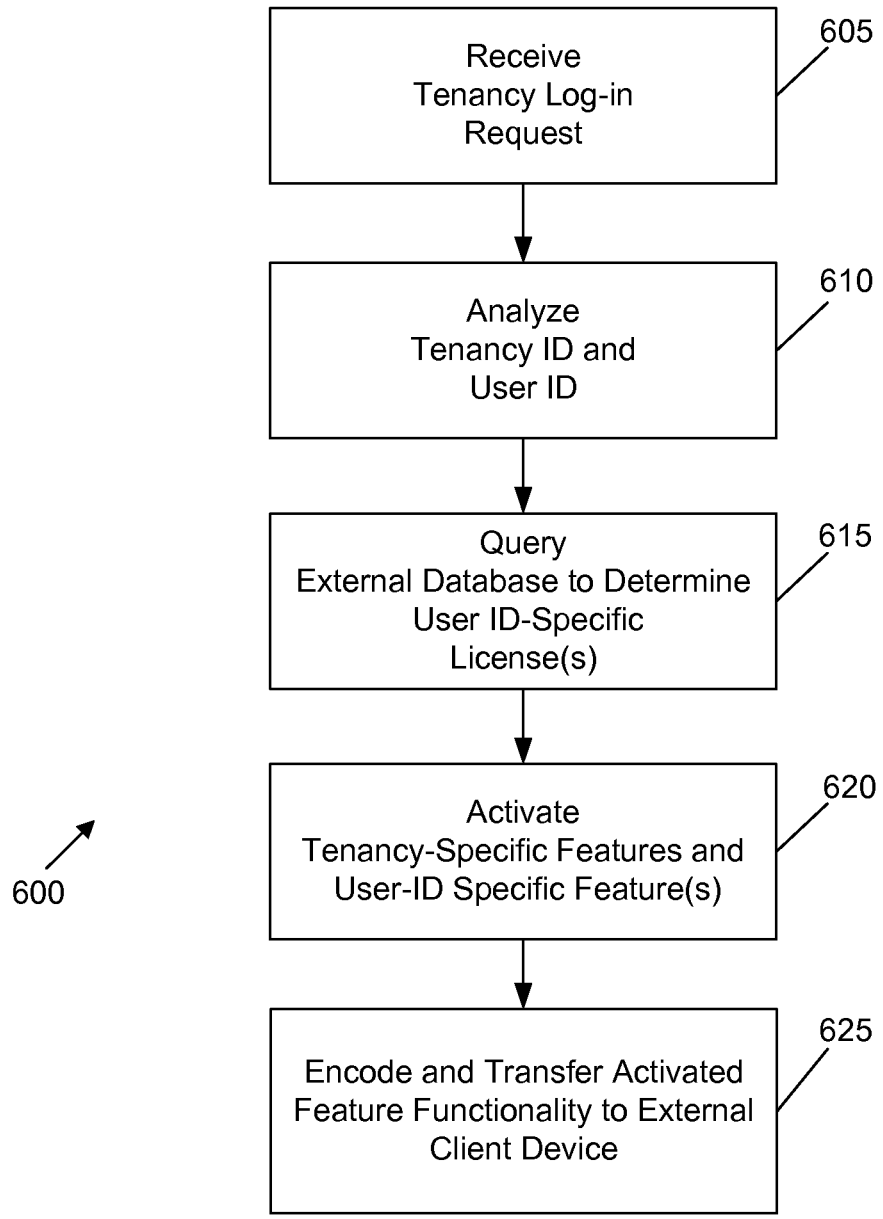
FIG. 6 shows an example method for provisioning a web service.

Referring now to FIG. 6, an example method 600 for provisioning a web page based on features purchased by an individual user and features purchased by an entity other than the individual user is shown according to the principles of the present disclosure. In example embodiments, the method 600 is implemented by a software application installed on a server device configured similar to the server device 510 described above in connection with FIG. 5. Other embodiments are possible as well.

The example method 600 begins at an operation 605. At operation 605, a tenancy log-in request including a URL ID and a user ID is received by the server device requesting access to a hosted document collaboration portal. In example embodiments, all features of the software application configured to implement functionality associated with the document collaboration portal are installed on the server device.

Operational flow then proceeds to an operation 610. At operation 610, the URL ID and the user ID are analyzed to respectively determine a feature pack associated with the URL ID and authenticate the user ID as valid or invalid for accessing a specific tenancy associated with the URL ID.

Operational flow then proceeds to an operation 615. At operation 615, an external database is queried to determine whether a user associated with the user ID has an individual license to use one or more features of the application as installed on the server device.

Operational flow then proceeds to an operation 620. At operation 620, all features corresponding with the feature pack associated with the URL ID and non-redundant features corresponding with the individual license associated with the user ID are activated.

Operational flow then proceeds to an operation 625. At operation 625, all functionality associated with features activated at operation 620 are encoded within the web-page data construct and transferred to a client device configured similar to the client device 505 described above in connection with FIG. 5.

In the example embodiment, a browser application of the client device interprets the web-page data construct and presents tenancy-specific features in accordance with the feature pack associated with the URL ID and user-specific features associated with the user ID to a user of the client device.

Figure 7:
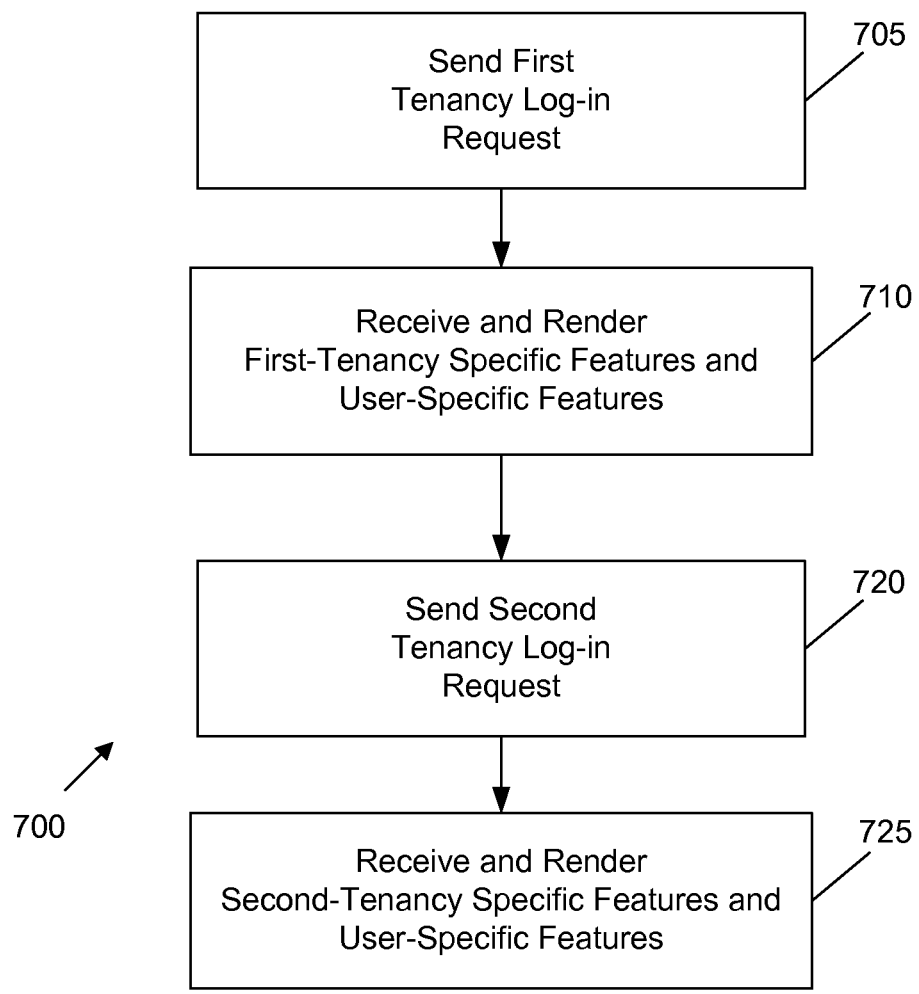
FIG. 7 shows a flowchart for an example method for leveraging user-specific features while collaborating with different tenancies.

For example, referring now to FIG. 7, an example method 700 for leveraging user-specific features while collaborating with different tenancies is shown according to the principles of the present disclosure.

In example embodiments, the method 700 is implemented by a browser application installed on a client device configured similar to the client device 505 described above in connection with FIG. 5. Other embodiments are possible as well.

The method 700 begins at an operation 705. At operation 705, a first tenancy log-in request including a first URL ID and a user ID is sent by the client device to an external server device requesting access to a first hosted document collaboration portal.

Operational flow then proceeds to an operation 710. At operation 710, the client device receives and renders all functionality associated with features corresponding to the first URL ID and the user ID. For example, functionality associated with features corresponding to the first URL ID may include features related to feature tags FA, FB, FF, and FG of the first tier described above with respect to FIG. 3. Functionality associated with features corresponding to the user ID may include features related to feature tags FC and FE of the individual license 340 also described above with respect to FIG. 3.

Operational flow then proceeds to an operation 720. At operation 720, a second tenancy log-in request including a second URL ID and the user ID is sent by the client device to an external server device requesting access to a second hosted document collaboration portal.

Operational flow then proceeds to an operation 725. At operation 725, the client device receives and renders all functionality associated with features corresponding to the second URL ID and the user ID. For example, functionality associated with features corresponding to the second URL ID may include features related to feature tags FA, FB, FC, FF, and FG offered by the second tier 330 described above with respect to FIG. 3. Functionality associated with features corresponding to the user ID may include features related to feature tags FC and FE of the individual license 340 also described above with respect to FIG. 3.

Figure 8:
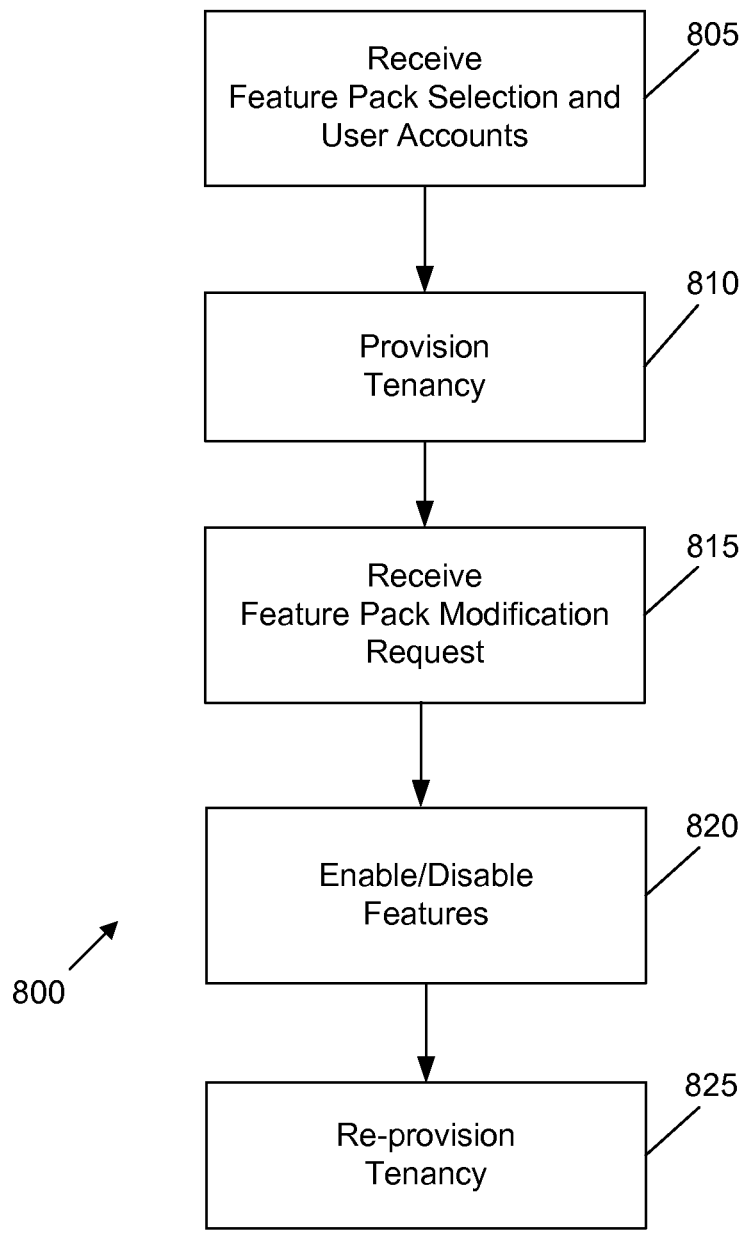
FIG. 8 shows a flowchart for an example method for provisioning and modifying a tenancy.

Referring now to FIG. 8, an example method 800 for provisioning and modifying a tenancy is shown according to the principles of the present disclosure. In example embodiments, the method 800 is implemented by a software application installed on a server device configured similar to the server device 510 described above in connection with FIG. 5. Other embodiments are possible as well.

The example method 800 begins at an operation 805, at which a feature pack selection and user accounts associated with the feature pack selection are received to instantiate an instance of a tenancy in support of a hosted collaboration portal that allows for collaboration between individual users. In some embodiments, the feature pack selection and user account information is received via an administration module of the software application as accessed via an external device (e.g., client device 505) in manner consistent with the examples described above with respect to FIGS. 4 and 5. However, other embodiments are possible.

Operational flow then proceeds to an operation 810. At operation 810, a tenancy is provisioned in accordance with the feature pack selection request received at operation 805. For example, an organization (e.g., first organization 400) may have purchased a first tiered set of features (e.g., first tier 325) such that one or more individual users ("User 1" and "User 2") can leverage the functionality of the first tiered set of features for document collaboration.

Operational flow then proceeds to an operation 815. At operation 815, a feature pack modification request is received including a request to upgrade or downgrade the feature pack selection received at operation 805.

Operational flow then proceeds to an operation 820. At operation 820, one or more features are enabled and/or disabled in accordance with the feature pack modification request received at operation 815.

Following upgrade or downgrade of features at operation 820, operation flow proceed to an operation 825 at which the tenancy as provisioned at operation 810 is re-provisioned in accordance with the feature pack modification request received at operation 815. In this manner, example method 800 is configured to permit addition or removal of features in a non-disruptive fashion.

The example embodiments described herein can be implemented as logical operations in a computing device in a networked computing system environment. The logical operations can be implemented as: (i) a sequence of computer implemented instructions, steps, or program modules running on a computing device; and (ii) interconnected logic or hardware modules running within a computing device.

For example, the logical operations can be implemented as algorithms in software, firmware, analog/digital circuitry, and/or any combination thereof, without deviating from the scope of the present disclosure. The software, firmware, or similar sequence of computer instructions can be encoded and stored upon a computer readable storage medium and can also be encoded within a carrier-wave signal for transmission between computing devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for providing an online collaboration site, the method comprising:
    receiving a request from a user to access the online collaboration site, the request including a tenancy identifier associated with a tenancy and a user identifier associated with the user;
    identifying document collaboration features for the user, the document collaboration features including a tenancy feature associated with the tenancy identifier and an individual feature associated with the user identifier, wherein the tenancy feature includes functionality subscribed to by an organization and which is accessible by the user, and the individual feature includes functionality individually subscribed to by the user; and
    providing the online collaboration site including the document collaboration features configured for the user.

2. The method of claim 1, wherein the document collaboration features correspond to document manipulation functionality provided by an application.

3. The method of claim 1, further comprising identifying resource features for the user, the resource features including computing resource functionality provided in support of an application.

4. The method of claim 1, wherein the tenancy identifier is a Uniform Resource Indicator (URL).

5. The method of claim 1, further comprising analyzing the tenancy identifier to determine the document collaboration features associated with the tenancy identifier.

6. The method of claim 1, further comprising analyzing the user identifier to authenticate the user identifier is valid for accessing the tenancy feature.

7. The method of claim 1, further comprising querying a database to determine whether any individual features are associated with the user identifier.

8. The method of claim 7, further comprising activating the document collaboration features associated with the tenancy identifier and any individual features associated with the user identifier.

9. The method of claim 1, further comprising encoding the document collaboration features.

10. A computer readable storage medium including instructions, which when executed by a processor, provide an online collaboration site by:
    receiving a request from a user to access the online collaboration site, the request including a tenancy identifier associated with a tenancy and a user identifier associated with the user;
    identifying document collaboration features for the user, the document collaboration features including a tenancy feature associated with the tenancy identifier and an individual feature associated with the user identifier, wherein the tenancy feature includes functionality subscribed to by an organization and which is accessible by the user, and the individual feature includes functionality individually subscribed to by the user; and
    providing the online collaboration site including the document collaboration features configured for the user.

11. The computer readable storage medium of claim 10, wherein the document collaboration features correspond to document manipulation functionality provided by an application.

12. The computer readable storage medium of claim 10, further comprising identifying resource features for the user, the resource features including computing resource functionality provided in support of an application.

13. The computer readable storage medium of claim 10, wherein the tenancy identifier is a Uniform Resource Indicator (URL).

14. The computer readable storage medium of claim 10, further comprising analyzing the tenancy identifier to determine the document collaboration features associated with the tenancy identifier.

15. The computer readable storage medium of claim 10, further comprising analyzing the user identifier to authenticate the user identifier is valid for accessing the tenancy features associated with the tenancy identifier.

16. The computer readable storage medium of claim 10, further comprising querying a database to determine whether any individual features are associated with the user identifier.

17. The computer readable storage medium of claim 16, further comprising activating the document collaboration features associated with the tenancy identifier and any individual features associated with the user identifier.

18. The computer readable storage medium of claim 10, further comprising encoding the document collaboration features.

19. A system for online collaboration, the system comprising:
    at least one computer readable storage medium; and
    at least one processing unit that executes instructions stored on the at least one computer readable storage medium to create:
        an application for online collaboration;
        a control module programmed to receive a request from a user to access an online collaboration site, the request including a tenancy identifier associated with a tenancy and a user identifier associated with the user, identify document collaboration features for the user, the document collaboration features including a tenancy feature associated with the tenancy identifier and an individual feature associated with the user identifier, wherein the tenancy feature includes functionality subscribed to by an organization and which is accessible by the user, and the individual feature includes functionality individually subscribed to by the user; and
        a web-page render module programmed to provide the online collaboration site including the document collaboration features configured for the user.

20. The system of claim 19, wherein the control module is further programmed to analyze the user identifier to authenticate the user identifier is valid for accessing the tenancy features associated with the tenancy identifier.

* * * * *